(12) United States Patent
Wilson

(10) Patent No.: US 12,227,455 B2
(45) Date of Patent: Feb. 18, 2025

(54) BUILDING MATERIALS COMPRISING AGGLOMERATED PARTICLES

(71) Applicant: Specialty Granules Investments LLC, Parsippany, NJ (US)

(72) Inventor: Peter Wilson, Knoxville, MD (US)

(73) Assignee: SPECIALTY GRANULES INVESTMENTS LLC, Parsippany, NJ (US)

(*) Notice: Subject to any disclaimer, the term of this patent is extended or adjusted under 35 U.S.C. 154(b) by 0 days.

(21) Appl. No.: 18/387,882

(22) Filed: Nov. 8, 2023

(65) Prior Publication Data

US 2024/0150239 A1    May 9, 2024

Related U.S. Application Data

(60) Provisional application No. 63/423,540, filed on Nov. 8, 2022.

(51) Int. Cl.
| | |
|---|---|
| *C04B 18/02* | (2006.01) |
| *C04B 14/14* | (2006.01) |
| *C04B 41/50* | (2006.01) |
| C04B 103/40 | (2006.01) |
| C04B 111/00 | (2006.01) |

(52) U.S. Cl.
CPC ............ *C04B 18/021* (2013.01); *C04B 14/14* (2013.01); *C04B 41/5024* (2013.01); *C04B 2103/406* (2013.01); *C04B 2111/00586* (2013.01)

(58) Field of Classification Search
CPC ..... C04B 14/041; C04B 14/14; C04B 18/021; C04B 18/064; C04B 20/1074; C04B 2111/00586; C04B 14/048; C04B 20/0016; C04B 2103/406; C04B 24/02; C04B 28/26; C04B 41/5024; E04D 1/22; E04D 2001/005; E04D 7/005; Y02W 30/91

See application file for complete search history.

(56) References Cited

U.S. PATENT DOCUMENTS

| | | | |
|---|---|---|---|
| 2,953,474 | A | 9/1960 | Wheeler |
| 2,981,636 | A | 4/1961 | Lodge et al. |
| 11,008,254 | B2 * | 5/2021 | Dunlap ................ C04B 18/021 |
| 11,226,432 | B2 | 1/2022 | Joedicke et al. |
| 2004/0116578 | A1 * | 6/2004 | Imanishi ................ C09C 1/405 |
| | | | 106/486 |
| 2013/0168616 | A1 | 7/2013 | Shiao et al. |
| 2020/0354282 | A1 * | 11/2020 | Schweiger .............. C04B 26/26 |
| 2021/0039995 | A1 * | 2/2021 | Dunlap .................... E04D 1/22 |

\* cited by examiner

*Primary Examiner* — Shuangyi Abu Ali
(74) *Attorney, Agent, or Firm* — Venable LLP

(57) ABSTRACT

Roofing granules comprising agglomerated inorganic material, and building materials, such as shingles, that include such roofing granules. By fabricating roofing granules from agglomerating inorganic material, in combination with a binder composition having a wetting agent, it is possible to increase the yield of the fabricated roofing granules and tailor the particle size distribution so as to provide optimal shingle surface coverage, thus reducing shingle weight and usage of raw materials. Additionally, the use of agglomeration permits the utilization of by-products from conventional granule production processes.

15 Claims, 1 Drawing Sheet

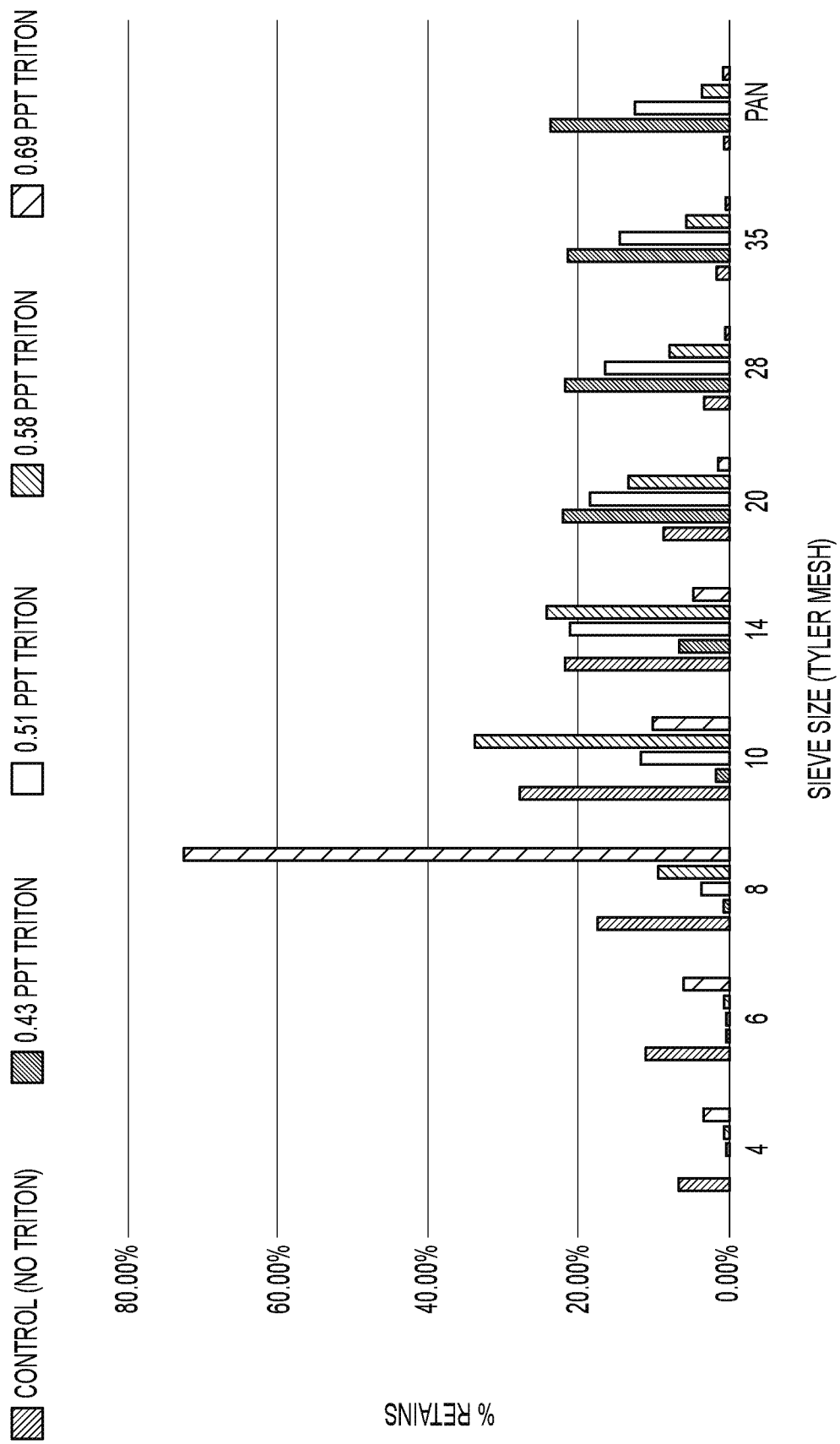

BUILDING MATERIALS COMPRISING AGGLOMERATED PARTICLES

This application claims the priority of U.S. provisional application Ser. No. U.S. 63/423,540 entitled "Building Materials Comprising Agglomerated Particles" filed Nov. 8, 2022, which is incorporated herein by reference in its entirety for all purposes.

FIELD OF THE INVENTION

The invention relates to building materials (such as shingles) that include roofing granules comprising agglomerated inorganic material. The invention also relates to roofing granules comprising agglomerated inorganic material. By fabricating roofing granules from agglomerated inorganic material, in combination with a binder composition having a wetting agent, it is possible to increase the yield of the fabricated roofing granules and tailor the particle size distribution so as to provide improved surface coverage for roofing products, thus reducing roofing product weight and usage of raw materials. Additionally, the use of agglomeration permits the utilization of by-products from conventional granule production processes.

BACKGROUND OF THE INVENTION

Traditional roofing materials, such as, e.g., shingles, are based upon a fiberglass or felt mat that is coated and impregnated with an asphalt-based composition that is coated with roofing granules. It is beneficial to reduce raw material costs by making use of by-products of other processes, such as rock fines.

There is thus a need for roofing granules that provide optimal shingle or roll roofing surface covering and that can be made from rock fines.

SUMMARY OF THE INVENTION

One embodiment of this invention pertains to a method comprising: (a) obtaining (i) at least one of a rock, a mineral, or a combination thereof, and (ii) a binder composition that includes a wetting agent; (b) mixing (i) the at least one of a rock, a mineral, or a combination thereof and (ii) the binder composition to produce agglomerated particles; and (c) applying the agglomerated particles to a sheet to form a roofing product.

Another embodiment of this invention pertains to a method comprising: (a) obtaining (i) at least one of a rock, a mineral, or a combination thereof, and (ii) a binder composition that includes a wetting agent, wherein the at least one of a rock, a mineral, or a combination thereof has a particle size passing US Mesh 20; (b) mixing (i) the at least one of a rock, a mineral, or a combination thereof and (ii) the binder composition to produce unsintered agglomerated particles; and (c) applying the unsintered agglomerated particles to a sheet to form a roofing product.

In one embodiment, the roofing product is a shingle or roll roofing.

In one embodiment, the wetting agent comprises a nonionic wetting agent. In another embodiment, the wetting agent comprises an alkoxylated alcohol, a detergent or surfactant, or a combination thereof.

In one embodiment, the wetting agent comprises between 0.05 wt % and 0.25 wt % with respect to a total weight of the binder composition. In one embodiment, the wetting agent comprises between 0.06 wt % and 0.25 wt % with respect to the total weight of the binder composition.

In one embodiment, the binder composition is added in an amount of 1 wt % to 15 wt % with respect to a total weight of the agglomerated particles.

In another embodiment, the binder composition is added in an amount of about 2 wt % to 14 wt % with respect to a total weight of the agglomerated particles.

In another embodiment, the binder composition is added in an amount of about 3 wt % to 13 wt % with respect to a total weight of the agglomerated particles. In one embodiment, the binder composition is added in an amount of about 6 wt % to 13 wt % with respect to a total weight of the agglomerated particles.

In another embodiment, the binder composition is added in an amount of about 5 wt % to 12 wt % with respect to a total weight of the agglomerated particles.

In one embodiment, the at least one of a rock, a mineral, or a combination thereof comprises one or more of basalt, metabasalt, andesite, granite, and rhyolite.

In one embodiment, the binder composition comprises sodium silicate, water, and the wetting agent.

In one embodiment, the binder composition comprises (i) sodium silicate in an amount of at least 60 wt % with respect to the total weight of the binder composition, (ii) water in an amount of at least 30 wt % with respect to the total weight of the binder composition, and (iii) the wetting agent in an amount of at least 0.2 wt % with respect to the total weight of the binder composition.

In another embodiment, the at least one of a rock, a mineral, or a combination thereof comprises metabasalt.

In one embodiment, the binder composition comprises sodium silicate.

In one embodiment, the agglomerated particles have a coating comprising silicate and clay.

In one embodiment, the mixing uses a pin mixer.

In one embodiment, the method further comprises pelletizing the agglomerated particles.

In one embodiment, the method further comprises drying the agglomerated particles.

Another embodiment of this invention pertains to a method comprising: (a) obtaining (i) at least one of a rock, a mineral, or combination thereof, and (ii) a binder composition that includes a wetting agent; (b) mixing the at least one of a rock, a mineral, or a combination thereof and the binder composition to produce agglomerated particles; and (c) applying the agglomerated particles to a sheet to form a shingle, wherein, when wt % is assessed with respect to a total weight of the agglomerated particles, the agglomerated particles have a particle size distribution comprising (1) at least about 10 wt % retained by US Mesh 50 after passing US Mesh 40, (2) at least about 5 wt % retained by US Mesh 60 after passing US Mesh 50, and (3) at least about 5 wt % retained by US Mesh 100 after passing US Mesh 60.

In another embodiment, the agglomerated particles have a particle size distribution comprising (1) at least about 20 wt % retained by US Mesh 50 after passing US Mesh 40, (2) at least about 10 wt % retained by US Mesh 60 after passing US Mesh 50, and (3) at least about 10 wt % retained by US Mesh 100 after passing US Mesh 60.

In another embodiment, the agglomerated particles have a particle size distribution comprising (1) at least about 10 wt % retained by US Mesh 100 after passing US Mesh 60, (2) at least about 10 wt % retained by US Mesh 200 after passing US Mesh 100, and (3) at least about 5 wt % retained by US Mesh 325 after passing US Mesh 200.

In one embodiment, the wetting agent comprises a nonionic wetting agent. In another embodiment, the wetting agent comprises an alkoxylated alcohol, a detergent or surfactant, or a combination thereof.

In one embodiment, the wetting agent comprises between 0.05 wt % and 0.25 wt % with respect to a total weight of the binder composition. In one embodiment, the wetting agent comprises between 0.06 wt % and 0.25 wt % with respect to the total weight of the binder composition.

In one embodiment, the binder composition is added in an amount of 1 wt % to 15 wt % with respect to a total weight of the agglomerated particles.

In another embodiment, the binder composition is added in an amount of about 2 wt % to 14 wt % with respect to a total weight of the agglomerated particles.

In another embodiment, the binder composition is added in an amount of about 3 wt % to 13 wt % with respect to a total weight of the agglomerated particles. In one embodiment, the binder composition is added in an amount of about 6 wt % to 13 wt % with respect to a total weight of the agglomerated particles.

In another embodiment, the binder composition is added in an amount of about 5 wt % to 12 wt % with respect to a total weight of the agglomerated particles.

In one embodiment, the at least one of a rock, a mineral, or a combination thereof comprises one or more of basalt, metabasalt, andesite, granite, and rhyolite.

In one embodiment, the binder composition comprises sodium silicate, water, and the wetting agent.

In one embodiment, the binder composition comprises (i) sodium silicate in an amount of at least 60 wt % with respect to the total weight of the binder composition, (ii) water in an amount of at least 30 wt % with respect to the total weight of the binder composition, and (iii) the wetting agent in an amount of at least 0.2 wt % with respect to the total weight of the binder composition.

In one embodiment, the at least one of a rock, a mineral, or a combination thereof comprises metabasalt.

In one embodiment, the binder composition comprises sodium silicate.

In one embodiment, the agglomerated particles have a coating comprising silicate and clay.

In one embodiment, the mixing uses a pin mixer.

In one embodiment, the method further comprises pelletizing the agglomerated particles.

In one embodiment, the method further comprises drying the agglomerated particles.

Yet another embodiment of this invention pertains to a roofing product (e.g., a shingle or roll roofing) comprising agglomerated particles comprising (a) at least one of a rock, a mineral, or a combination thereof, and (b) a binder composition that includes a wetting agent, wherein, when wt % is assessed with respect to a total weight of the agglomerated particles, the agglomerated particles have a particle size distribution comprising (1) at least about 10 wt % retained by US Mesh 50 after passing US Mesh 40, (2) at least about 5 wt % retained by US Mesh 60 after passing US Mesh 50, and (3) at least about 5 wt % retained by US Mesh 100 after passing US Mesh 60.

In another embodiment, the agglomerated particles have a particle size distribution comprising (1) at least about 20 wt % retained by US Mesh 50 after passing US Mesh 40, (2) at least about 10 wt % retained by US Mesh 60 after passing US Mesh 50, and (3) at least about 10 wt % retained by US Mesh 100 after passing US Mesh 60.

In another embodiment, the agglomerated particles have a particle size distribution comprising (1) at least about 10 wt % retained by US Mesh 100 after passing US Mesh 60, (2) at least about 10 wt % retained by US Mesh 200 after passing US Mesh 100, and (3) at least about 5 wt % retained by US Mesh 325 after passing US Mesh 200.

In one embodiment, the wetting agent comprises a nonionic wetting agent. In another embodiment, the wetting agent comprises an alkoxylated alcohol, a detergent or surfactant, or a combination thereof.

In one embodiment, the wetting agent comprises between 0.05 wt % and 0.25 wt % with respect to a total weight of the binder composition. In one embodiment, the wetting agent comprises between 0.06 wt % and 0.25 wt % with respect to the total weight of the binder composition.

In one embodiment, the binder composition is present in the agglomerated particles in an amount of about 1 wt % to 15 wt % with respect to a total weight of the agglomerated particles.

In one embodiment, the binder composition is present in the agglomerated particles in an amount of about 2 wt % to 14 wt % with respect to a total weight of the agglomerated particles.

In another embodiment, the binder composition is present in the agglomerated particles in an amount of about 3 wt % to 13 wt % with respect to a total weight of the agglomerated particles. In one embodiment, the binder composition is present in the agglomerated particles in an amount of about 6 wt % to 13 wt % with respect to a total weight of the agglomerated particles.

In another embodiment, the binder composition is present in the agglomerated particles in an amount of about 5 wt % to 12 wt % with respect to a total weight of the agglomerated particles.

In one embodiment, the at least one of a rock, a mineral, or a combination thereof comprises one or more of basalt, metabasalt, andesite, granite, and rhyolite.

In one embodiment, the binder composition comprises sodium silicate, water, and the wetting agent.

In one embodiment, the binder composition comprises (i) sodium silicate in an amount of at least 60 wt % with respect to the total weight of the binder composition, (ii) water in an amount of at least 30 wt % with respect to the total weight of the binder composition, and (iii) the wetting agent in an amount of at least 0.2 wt % with respect to the total weight of the binder composition.

In one embodiment, the at least one of a rock, a mineral, or a combination thereof comprises metabasalt.

In one embodiment, the binder composition comprises sodium silicate.

In one embodiment, the agglomerated particles have a coating comprising silicate and clay.

BRIEF DESCRIPTION OF THE FIGURES

For a more complete understanding of the invention and the advantages thereof, reference is made to the following descriptions, taken in conjunction with the accompanying figures, in which:

FIG. 1 is a graph that illustrates the percent yield (or percentage retained) as compared to certain sieve sizes (Tyler Mesh) as the amount of wetting agent in the binder composition is increased.

DETAILED DESCRIPTION OF THE INVENTION

Among those benefits and improvements that have been disclosed, other objects and advantages of this disclosure will become apparent from the following description taken in conjunction with the accompanying FIGURES. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though they may. Furthermore, the phrases "in another embodiment" and "in some other embodiments" as used herein do not necessarily refer to a different embodiment, although they may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising," "including," and "having" do not limit the scope of a specific claim to the materials or steps recited by the claim.

As used herein, terms such as "consisting of" and "composed of" limit the scope of a specific claim to the materials and steps recited by the claim.

All prior patents, publications, and test methods referenced herein are incorporated by reference in their entireties.

As used herein, the term "weight percent" or "% by weight" means the percentage by weight of (i) the binder composition based upon a total weight of the agglomerated particles, or (ii) the wetting agent based upon a total weight of the binder composition.

As used herein, the term "a majority of" means greater than 50% by weight.

As used herein, the term "roofing material" includes, but is not limited to, shingles, roll roofing, roofing membranes, including, e.g., waterproofing membranes, and underlayment.

As used herein, the terms "detergent" or "surfactant" are used interchangeably.

The present invention relates to the inclusion of a wetting agent with rock fines for forming agglomerated particles for roofing applications (e.g., roofing granules). In this regard, using a wetting agent during pelletization of headlap roofing granules improved control over the final size of the granules. Thus, according to an aspect of the invention, an increase in the yield of a process of making pelletized headlap roofing granules can occur by improving control over the size distribution of the pelletized granules.

Granulation of headlap pellets on a disk pelletizer results in granules with a size distribution that is often not suitable for the desired application. Current methods to correct this involve screening the oversized or undersized pellets, crushing the pellets down to feed stock size, and recirculating, which is a costly process. Thus, according to one aspect of the invention, introducing a wetting agent to the process of making pelletized headlap roofing granules enables better control over the size distribution, reducing the need for screening and recirculating of the material. For example, according to one embodiment, incorporation of a non-ionic wetting agent into a binder composition (e.g., a sodium silicate binder composition), including, e.g., adding a wetting agent in concentrations down to 0.05% mass loading and up to 0.25% mass loading, when making pelletized headlap roofing granules showed improved control over the particle size distribution of the resulting pellets. This improves the yield of the process by minimizing the amount of oversized and undersized particles that are formed.

One embodiment of this invention pertains to a roofing shingle that includes roofing granules comprised of agglomerated particles. Agglomerated particles may be applied to the back surface or front surface, including the buttlap and/or headlap of the shingle. In an embodiment, the agglomerated particles applied to the back surface, buttlap and/or headlap of the shingle have different particle size distributions. The choice of particle size distribution selected for a shingle surface may be influenced by the balance of surface coverage, shingle weight, degree of flatness and impact resistance required. The shingle may be a single-layer shingle or a laminated shingle.

Examples of a sheet that may be used to make the shingle are as follows. In particular, in an embodiment, the shingle may be formed from a fiberglass mat with an asphalt coating on both sides of the mat. In an embodiment, the shingle may be formed from organic felt or other types of base material, including synthetic mats or synthetic glass/hybrid mats having an appropriate coating. Non-limiting examples of coatings include asphalt and modified bituminous coatings based on atactic polypropylene (APP), styrene-butadiane-styrene (SBS), styrene-ethylene-butadiene-styrene (SEBS), amorphous polyalpha olefin (APAO), thermoplastic polyolefin (TPO), synthetic rubber or other asphaltic modifiers.

In an embodiment, two or more shingles are installed on a roof deck in a roofing system such that the shingles are in a row from left to right and the lateral edges of the shingles in the row are contiguous with each other so as to abut each other, i.e., their lateral edges are adjacent to one another. Each row represents a course and the shingles are applied in overlapping courses on the roof deck, wherein the buttlap portion of a subsequent course is placed on the headlap portion of a previous course. In an embodiment, the headlap portion of the shingle is at least as wide as the buttlap portion of the shingle so that when the shingles are installed on a roof deck in overlapping courses, the entire buttlap portion of a subsequent course has headlap beneath it. In an embodiment, an edge of the shingle has a plurality of dragon teeth with openings therebetween. In an embodiment of the laminated shingle, a backer strip is provided under the dragon teeth, with portions of the backer strip exposed through the openings between the dragon teeth. In an embodiment of the single layer shingle, when the shingle is installed on a roof deck, the dragon teeth of a second layer of shingles is placed on the headlap of a previously installed layer of shingles, such that portions of the headlap region are exposed through the openings between the dragon teeth.

One embodiment pertains to a roofing system comprising one or more shingles that comprise the agglomerated particles.

A. Agglomerated Particles—Composition

In an embodiment, the agglomerated particles comprise (i) a binder composition having a wetting agent and (ii) an inorganic material. In an embodiment, the inorganic material comprises rock and/or mineral fragments (i.e., fragments of (a) rock and/or (b) mineral). In an embodiment, the rock and/or mineral fragments comprise fines and/or larger particle sizes.

In one embodiment, the rock and/or mineral fragments are of such a particle size as to pass US Mesh 40. In other embodiments, the rock and/or mineral fragments are of such a particle size as to pass US Mesh 50, or US Mesh 60, or US Mesh 70, or US Mesh 100, or US Mesh 120, or US Mesh 140, or US Mesh 200, or US Mesh 230, or US Mesh 270, or US Mesh 325. Ranges based on any of the foregoing are also contemplated, e.g., the rock and/or mineral fragments may have particle sizes passing US Mesh 40 but retained by US Mesh 325.

A non-limiting example of the wetting agent is a non-ionic wetting agent. According to one embodiment, the wetting agent comprises an alkoxylated alcohol (including, e.g., a non-ionic alkoxylated alcohol and/or a modified alkoxylated alcohol), a detergent or surfactant (including, e.g., a non-ionic detergent or surfactant), or a combination thereof. Non-limiting examples of wetting agents include, for example, DeIONIC LF-60, which is a non-ionic alkoxylated alcohol that is available from DeForest Enterprises, Inc., Boca Raton, FL; DeIONIC 100-VLF, which is a modified alkoxylated alcohol that is available from DeForest Enterprises Inc., Boca Raton, FL; DeIONIC LF-80MOD, which is a modified alkoxylated alcohol that is available from DeForest Enterprises Inc., Boca Raton, FL; and TRITON X-100, which is a non-ionic detergent that is available from Sigma, St. Louis, MO.

A non-limiting example of the binder composition includes sodium silicate. According to one embodiment, the binder composition comprises sodium silicate, water, and the wetting agent. In one embodiment, the binder composition comprises (i) sodium silicate in an amount of at least 60 wt % with respect to the total weight of the binder composition, (ii) water in an amount of at least 30 wt % with respect to the total weight of the binder composition, and (iii) the wetting agent in an amount of at least 0.2 wt % with respect to the total weight of the binder composition. In another embodiment, the binder composition comprises (i) sodium silicate in an amount of between 50 wt % and 80 wt % with respect to the total weight of the binder composition, (ii) water in an amount of between 20 wt % and 40 wt % with respect to the total weight of the binder composition, and (iii) the wetting agent in an amount of between 0.2 wt % and 0.3 wt % with respect to the total weight of the binder composition. In another embodiment, the binder composition comprises (i) sodium silicate in an amount of between 60 wt % and 70 wt % with respect to the total weight of the binder composition, (ii) water in an amount of between 30 wt % and 40 wt % with respect to the total weight of the binder composition, and (iii) the wetting agent in an amount of between 0.2 wt % and 0.25 wt % with respect to the total weight of the binder composition.

Non-limiting examples of rock and/or mineral materials include igneous rocks such as basalt, andesite, granite, and rhyolite, amphibolite produced from the metamorphism of the basalt parent such as metabasalt, or combinations thereof—e.g., basalt and metabasalt; basalt and andesite.

According to one embodiment, a lower amount of wetting agent is needed with rock and/or mineral materials (e.g., rock fines) such as, e.g., granite or rhyolite, which cannot easily be pelletized without the use of a wetting agent. Improvement in particle size and ease of pelletization is seen in basalt and metabasalt rock fines as well. The rock fines to be used can consist of coarser material than could be achievable without the use of a wetting agent.

In an embodiment, the content of the wetting agent in the binder composition is between 0.05 wt % and 0.25 wt % with respect to the total weight of the binder composition. In an embodiment, the content of the wetting agent in the binder composition is between 0.06 wt % and 0.25 wt % with respect to the total weight of the binder composition. In an embodiment, the content of the wetting agent in the binder composition is between 0.07 wt % and 0.25 wt % with respect to the total weight of the binder composition. In another embodiment, the content of the wetting agent in the binder composition is between 0.08 wt % and 0.25 wt % with respect to the total weight of the binder composition. In an embodiment, the content of the wetting agent in the binder composition is between 0.09 wt % and 0.25 wt % with respect to the total weight of the binder composition. In an embodiment, the content of the wetting agent in the binder composition is between 0.1 wt % and 0.25 wt % with respect to the total weight of the binder composition. In an embodiment, the content of the wetting agent in the binder composition is between 0.15 wt % and 0.25 wt % with respect to the total weight of the binder composition. In an embodiment, the content of the wetting agent in the binder composition is between 0.2 wt % and 0.25 wt % with respect to the total weight of the binder composition.

In an embodiment, the content of the binder composition in the agglomerated particles is at least about 1 wt %, at least about 2 wt %, at least about 3 wt %, at least about 5 wt %, at least about 6 wt %, at least about 10 wt %, at least about 12 wt %, at least about 13 wt %, at least about 14 wt %, or at least about 15 wt %.

In an embodiment, the content of the binder composition in the agglomerated particles is from about 1 wt % to about 15 wt %. In an embodiment, the content of the binder composition in the agglomerated particles is from about 2 wt % to about 15 wt %. In an embodiment, the content of the binder composition in the agglomerated particles is from about 3 wt % to about 15 wt %. In an embodiment, the content of the binder composition in the agglomerated particles is from about 4 wt % to about 15 wt %. In an embodiment, the content of the binder composition in the agglomerated particles is from about 5 wt % to about 15 wt %. In an embodiment, the content of the binder composition in the agglomerated particles is from about 6 wt % to about 15 wt %. In an embodiment, the content of the binder composition in the agglomerated particles is from about 7 wt % to about 15 wt %. In an embodiment, the content of the binder composition in the agglomerated particles is from about 8 wt % to about 15 wt %. In an embodiment, the content of the binder composition in the agglomerated particles is from about 9 wt % to about 15 wt %. In an embodiment, the content of the binder composition in the agglomerated particles is from about 10 wt % to about 15 wt %. In an embodiment, the content of the binder composition in the agglomerated particles is from about 11 wt % to about 15 wt %. In an embodiment, the content of the binder composition in the agglomerated particles is from about 12 wt % to about 15 wt %. In an embodiment, the content of the binder composition in the agglomerated particles is from about 13 wt % to about 15 wt %. In an embodiment, the content of the binder composition in the agglomerated particles is from about 14 wt % to about 15 wt %.

In an embodiment, the content of the binder composition in the agglomerated particles is from about 1 wt % to about 14 wt %. In an embodiment, the content of the binder composition in the agglomerated particles is from about 2 wt % to about 14 wt %. In an embodiment, the content of the binder composition in the agglomerated particles is from about 3 wt % to about 14 wt %. In an embodiment, the content of the binder composition in the agglomerated particles is from about 4 wt % to about 14 wt %. In an embodiment, the content of the binder composition in the agglomerated particles is from about 5 wt % to about 14 wt %. In an embodiment, the content of the binder composition in the agglomerated particles is from about 6 wt % to about 14 wt %. In an embodiment, the content of the binder composition in the agglomerated particles is from about 7 wt % to about 14 wt %. In an embodiment, the content of the binder composition in the agglomerated particles is from about 8 wt % to about 14 wt %. In an embodiment, the content of the binder composition in the agglomerated particles is from about 9 wt % to about 14 wt %. In an embodiment, the content of the binder composition in the agglomerated particles is from about 10 wt % to about 14 wt %. In an embodiment, the content of the binder composition in the agglomerated particles is from about 11 wt % to about 14 wt %. In an embodiment, the content of the binder composition in the agglomerated particles is from about 12 wt % to about 14 wt %. In an embodiment, the content of the binder composition in the agglomerated particles is from about 13 wt % to about 14 wt %.

In an embodiment, the content of the binder composition in the agglomerated particles is from about 1 wt % to about 13 wt %. In an embodiment, the content of the binder composition in the agglomerated particles is from about 2 wt % to about 13 wt %. In an embodiment, the content of the binder composition in the agglomerated particles is from about 3 wt % to about 13 wt %. In an embodiment, the content of the binder composition in the agglomerated particles is from about 4 wt % to about 13 wt %. In an embodiment, the content of the binder composition in the agglomerated particles is from about 5 wt % to about 13 wt %. In an embodiment, the content of the binder composition in the agglomerated particles is from about 6 wt % to about 13 wt %. In an embodiment, the content of the binder composition in the agglomerated particles is from about 7 wt % to about 13 wt %. In an embodiment, the content of the binder composition in the agglomerated particles is from about 8 wt % to about 13 wt %. In an embodiment, the content of the binder composition in the agglomerated particles is from about 9 wt % to about 13 wt %. In an embodiment, the content of the binder composition in the agglomerated particles is from about 10 wt % to about 13 wt %. In an embodiment, the content of the binder composition in the agglomerated particles is from about 11 wt % to about 13 wt %. In an embodiment, the content of the binder composition in the agglomerated particles is from about 12 wt % to about 13 wt %.

In an embodiment, the content of the binder composition in the agglomerated particles is from about 1 wt % to about 12 wt %. In an embodiment, the content of the binder composition in the agglomerated particles is from about 2 wt % to about 12 wt %. In an embodiment, the content of the binder composition in the agglomerated particles is from about 3 wt % to about 12 wt %. In an embodiment, the content of the binder composition in the agglomerated particles is from about 4 wt % to about 12 wt %. In an embodiment, the content of the binder composition in the agglomerated particles is from about 5 wt % to about 12 wt %. In an embodiment, the content of the binder composition in the agglomerated particles is from about 6 wt % to about 12 wt %. In an embodiment, the content of the binder composition in the agglomerated particles is from about 7 wt % to about 12 wt %. In an embodiment, the content of the binder composition in the agglomerated particles is from about 8 wt % to about 12 wt %. In an embodiment, the content of the binder composition in the agglomerated particles is from about 9 wt % to about 12 wt %. In an embodiment, the content of the binder composition in the agglomerated particles is from about 10 wt % to about 12 wt %. In an embodiment, the content of the binder composition in the agglomerated particles is from about 11 wt % to about 12 wt %.

In an embodiment, the content of the binder composition in the agglomerated particles is about 12 wt %. In an embodiment, the content of the binder composition in the agglomerated particles is about 13 wt %. In an embodiment, the content of the binder composition in the agglomerated particles is about 13.5 wt %. In an embodiment, the content of the binder composition in the agglomerated particles is about 14 wt %.

In embodiments, the agglomerated particles comprise the content of the binder composition of any of the embodiments detailed herein with the rock and/or mineral fragments forming the remainder.

In an embodiment, the agglomerated particles are coated. In an embodiment, the coating is semi-ceramic. In an embodiment, the semi-ceramic coating comprises silicate and clay. In an embodiment, the coating provides color to the agglomerated particles. In an embodiment, coated agglomerated particles are applied to the buttlap of the shingle.

In one embodiment, the agglomerated particles consist essentially of, or consist of, (a) the rock and/or mineral fragments and (b) the binder composition that includes a wetting agent, or (a) the rock and/or mineral fragments, (b) the binder composition that includes a wetting agent, and (c) the coating.

B. Agglomerated Particles—Particle Size Distribution

In an embodiment, the agglomerated particles have a particle size distribution. In an embodiment, the particle size distribution is monomodal, bimodal or multimodal. That is, the agglomerated particles may have one, two or multiple modal sizes.

In an embodiment, the particle size distribution of the agglomerated particles applied to the back surface of the shingle comprises at least about 10 wt % particles of US Mesh 50, at least about 20 wt % particles of US Mesh 50, at least about 30 wt % particles of US Mesh 50, or at least about 40 wt % particles of US Mesh 50. In an embodiment, the particle size distribution of the agglomerated particles applied to the back surface of the shingle comprises at least about 5 wt % particles of US Mesh 60, at least about 10 wt % particles of US Mesh 60, at least about 20 wt % particles of US Mesh 60, or at least about 30 wt % particles of US Mesh 60. In an embodiment, the particle size distribution of the agglomerated particles applied to the back surface of the shingle comprises at least about 5 wt % particles of US Mesh 100, at least about 10 wt % particles of US Mesh 100, at least about 20 wt % particles of US Mesh 100, or at least about 30 wt % particles of US Mesh 100.

In another embodiment, the particle size distribution of the agglomerated particles applied to the headlap of the shingle comprises at least about 1 wt % particles of US Mesh 200, at least about 2 wt % particles of US Mesh 200, at least about 5 wt % particles of US Mesh 200, at least about 10 wt % particles of US Mesh 200, at least about 20 wt % particles of US Mesh 200, or at least at least about 30 wt % particles of US Mesh 200. In an embodiment, the particle size distribution of the agglomerated particles applied to the headlap of the shingle comprises at least about 1 wt % particles of US Mesh 325, at least about 2 wt % particles of US Mesh 325, at least about 5 wt % particles of US Mesh 325, at least about 10 wt % particles of US Mesh 325, at least about 20 wt % particles of US Mesh 325, or at least at least about 30 wt % particles of US Mesh 325.

In another embodiment, the particle size distribution of the agglomerated particles applied to the headlap of the shingle comprises at least about 1 wt % particles of US Mesh 20, at least about 2 wt % particles of US Mesh 20, at least about 5 wt % particles of US Mesh 20, at least about 10 wt % particles of US Mesh 20, at least about 20 wt % particles of US Mesh 20, or at least at least about 30 wt % particles of US Mesh 20. In an embodiment, the particle size distribution of the agglomerated particles applied to the headlap of the shingle comprises at least about 40 wt % particles of US Mesh 30, at least about 50 wt % particles of US Mesh 30, at least about 60 wt % particles of US Mesh 30, at least about 70 wt % particles of US Mesh 30, or at least about 80 wt % particles of US Mesh 30. In an embodiment, the particle size distribution of the agglomerated particles applied to the headlap of the shingle comprises at least about 2 wt % particles of US Mesh 40, at least about 4 wt % particles of US Mesh 40, at least about 10 wt % particles of US Mesh 40, at least about 20 wt % particles of US Mesh 40, at least about 30 wt % particles of US Mesh 40, or at least about 40 wt % particles of US Mesh 40.

C. Method of Making the Agglomerated Particles

One embodiment of this invention pertains to a method of making agglomerated particles that are applied to the shingles. In an embodiment, rock and/or mineral fragments are combined (or mixed) with a liquid binder composition (having a wetting agent) in a pin mixer. In the pin mixer, pins or rods attached to a horizontal spinning shaft mix the components and produce agglomerated particles by the action of centrifugal force. In an embodiment, the volume of the binder composition (having the wetting agent) is typically between 1-5 wt % based on the total mass of the dry material at this step. In an embodiment, the agglomerated particles produced by the pin mixer are substantially spherical. In an embodiment, the agglomerated particles produced by the pin mixer may be dried and used directly. Agglomerated particles made by the pin mixer may be applied to the back surface or headlap of a shingle.

In another embodiment, once the material is mixed in the pix mixer, the agglomerated particles produced by the pin mixer are combined with further liquid binder composition (having a wetting agent) in a disc or pan pelletizer. The agglomerated particles produced by the pin mixer are fed into the disk/pan pelletizer where the binder composition (having the wetting agent) is added to encourage pelletization. According to one embodiment, the volume of the binder composition (having the wetting agent) at this step is typically between 5-12 wt % based on the mass of the total dry mass. The agglomerated particle size is increased by the actions of tumble growth and centrifugal force. The agglomerated particle size may be controlled by varying the disc angle and speed of rotation, and by modulating the properties of the input particles and liquid binder composition. Once the desired agglomerated particle size is achieved, the agglomerated particles may be dried (e.g., in an oven or a fluidized bed dryer). The disc or pan pelletizer increases the agglomerated particle size and produces agglomerated particles that may be applied to the front surface buttlap of a shingle. In an embodiment, the agglomerated particles are dried after leaving the pin mixer, or disc or pan pelletizer. In an embodiment, the agglomerated particles are dried in a fluid bed drying system. In the fluid bed drying system, hot air flows through a perforated plate that both dries the agglomerated particles and moves the agglomerated particles through the apparatus. In an embodiment, the fluid bed drying system comprises multiple heating zones and a final cooling zone.

According to one embodiment, the overall amount of the binder composition (having the wetting agent) used in the process described above is typically 13 wt % based on the total dry mass.

D. Method of Applying the Agglomerated Particles to a Roofing Shingle

In some embodiments, the invention relates to the method of applying the agglomerated particles to a shingle. In some embodiments, the method includes application of the agglomerated particles to at least one of the back surface or front surface, including the buttlap or the headlap of the shingle. Manufacturing the shingle includes applying agglomerated particles to asphalt coated sheeting. The asphalt sheet is then pressed in a press roll unit, such that the agglomerated particles embed in the asphalt coating. The asphalt sheet is then cut to the desired shape on a machine line. In embodiments, the invention includes the method of making the agglomerated particles and applying the agglomerated particles to a shingle as detailed herein.

In one embodiment, the agglomerated particles are not sintered before being used. In other words, the agglomerated particles are, without being sintered, used to make a roofing material or product such as a shingle or roll roofing. As used herein "sintering" is the process of compacting and forming a solid mass of material by heat or pressure without melting it to the point of liquefaction.

E. Examples

Specific embodiments of the invention will now be demonstrated by reference to the following examples. It should be understood that these examples are disclosed by way of illustrating the invention and should not be taken in any way to limit the scope of the invention.

Example 1

A binder composition was prepared as follows: 66.7 wt % sodium silicate solution, 33.09 wt % water, and 0.21 wt % wetting agent based on the total weight of the binder composition. This binder composition was combined with dry rock fines (e.g., basalt or metabasalt) to prepare agglomerated particles.

An exemplary particle size distribution of the prepared agglomerated particles that can applied to a back surface and/or a front surface of a shingle is given in Table 1.

TABLE 1

| US Mesh | Tyler Mesh | % Retains |
|---------|------------|-----------|
| 20      | 20         | 0.0%      |
| 40      | 35         | 17.5%     |
| 50      | 48         | 19.5%     |
| 60      | 60         | 11.2%     |
| 100     | 100        | 19.9%     |
| 200     | 200        | 14.3%     |
| 325     | 325        | 8.4%      |
| Pan     | Pan        | 9.2%      |
| Total   |            | 100%      |

The choice of particle size distribution selected for a shingle may be influenced by the balance of surface coverage, shingle weight, degree of flatness and impact resistance required.

Example 2

Agglomerated particles were prepared using rock fines (e.g., basalt or metabasalt) and a binder composition having differing amounts of wetting agent (i.e., 0.43 ppt Triton X-100, 0.51 ppt Triton X-100, 0.58 ppt Triton X-100, and 0.69 ppt Triton X-100) as compared to control agglomerated particles that were prepared using rock fines (e.g., basalt or metabasalt) and a binder composition having no wetting agent. FIG. 1 illustrates the results of this example by showing the percent yield (or percentage retained) over certain sieve sizes (Tyler Mesh) as the amount of wetting agent in the binder composition is increased in the exemplary agglomerated particles as compared to the control particles.

In FIG. 1, the control particles required a mass of a binder composition of about 16.7 wt % of the dry mass in order to pelletize, whereas the exemplary particles/pellets with the wetting agent required only a mass of the binder composition of about 13.5 wt % of the dry mass. By contrast, if the binder composition is added to rock fines without the presence of a wetting agent at this same rate of 13.5 wt % of the dry mass, then the mass will fail to pelletize and the particle size distribution will resemble that of the original starting fines.

For roofing granule purposes, pellets between 10 and 35 mesh range are acceptable, and any pellets outside that range are waste. As shown in FIG. 1, as the wetting agent content increases, the acceptable yield increases until it is optimized at 0.58 pounds/ton of wetting agent (Triton X-100), with a total yield of about 85% being achieved/retained between the 10 and 35 mesh range at the optimized content of 0.58 pounds/ton of wetting agent. By contrast, as further shown in FIG. 1, the particle size becomes concentrated at 8 mesh, with at least 70% being retained at 8 mesh, when the wetting agent is added at a rate of 0.69 pounds/ton of wetting agent (Triton X-100).

By way of reference, below is a table, Table 2, showing the correspondence between US Mesh, Tyler Mesh, and the sieve opening size in inches and micrometers:

TABLE 2

| ISO Standard Sieve Size | Opening | | Standard Mesh | |
| --- | --- | --- | --- | --- |
| mm or µm as indicated | inches (in) approximate equivalents | mm | US Mesh | Tyler Mesh |
| 5.60 mm | 0.2230 | 5.600 | 3.5 | 3.5 |
| 4.75 mm | 0.1870 | 4.750 | 4 | 4 |
| 4.00 mm | 0.1570 | 4.000 | 5 | 5 |
| 3.35 mm | 0.1320 | 3.350 | 6 | 6 |
| 2.80 mm | 0.1100 | 2.800 | 7 | 7 |
| 2.36 mm | 0.0937 | 2.360 | 8 | 8 |
| 2.00 mm | 0.0787 | 2.000 | 10 | 9 |
| 1.70 mm | 0.0661 | 1.700 | 12 | 10 |
| 1.40 mm | 0.0555 | 1.400 | 14 | 12 |
| 1.18 mm | 0.0469 | 1.180 | 16 | 14 |
| 1.00 mm | 0.0394 | 1.000 | 18 | 16 |
| 850 µm | 0.0331 | 0.850 | 20 | 20 |
| 710 µm | 0.0278 | 0.710 | 25 | 24 |
| 600 µm | 0.0234 | 0.600 | 30 | 28 |
| 500 µm | 0.0197 | 0.500 | 35 | 32 |
| 425 µm | 0.0165 | 0.425 | 40 | 35 |
| 355 µm | 0.0139 | 0.355 | 45 | 42 |
| 300 µm | 0.0117 | 0.300 | 50 | 48 |
| 250 µm | 0.0098 | 0.250 | 60 | 60 |
| 212 µm | 0.0083 | 0.212 | 70 | 65 |
| 180 µm | 0.0070 | 0.180 | 80 | 80 |
| 150 µm | 0.0059 | 0.150 | 100 | 100 |
| 125 µm | 0.0049 | 0.125 | 120 | 115 |
| 106 µm | 0.0041 | 0.106 | 140 | 150 |
| 90 µm | 0.0035 | 0.090 | 170 | 170 |
| 75 µm | 0.0029 | 0.075 | 200 | 200 |
| 63 µm | 0.0025 | 0.063 | 230 | 250 |
| 53 µm | 0.0021 | 0.053 | 270 | 270 |
| 45 µm | 0.0017 | 0.045 | 325 | 325 |
| 38 µm | 0.0015 | 0.038 | 400 | 400 |
| 32 µm | 0.0012 | 0.032 | 450 | |
| 25 µm | 0.0010 | 0.025 | 500 | |
| 20 µm | 0.0008 | 0.020 | 635 | |

According to one embodiment, the net effect of including a wetting agent is to accomplish two things: (i) decreased need for the costly binder to promote agglomeration and (ii) improved control over final particle size distribution resulting in higher yield.

As discussed above, one example of rock and/or mineral is basalt; however, metabasalt (which is an amphibolite produced from the metamorphism of the basalt parent) may be used in addition to or instead of basalt. In other words, where the embodiments use the term basalt, they should be read as describing the use of basalt, metabasalt, or a combination of basalt and metabasalt.

Although the invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

The invention claimed is:

1. A method comprising:
    (a) obtaining (i) at least one of a rock, a mineral, or a combination thereof, and (ii) a binder composition that includes a wetting agent, wherein the wetting agent comprises from 0.05 wt % to 0.3 wt % with respect to a total weight of the binder composition;
    (b) mixing (i) the at least one of a rock, a mineral, or a combination thereof and (ii) the binder composition to produce agglomerated particles; and
    (c) applying the agglomerated particles to a sheet to form a roofing product.

2. The method according to claim 1, wherein the roofing product is a shingle or roll roofing.

3. The method according to claim 1, wherein the wetting agent comprises a non-ionic wetting agent.

4. The method according to claim 3, wherein the wetting agent comprises an alkoxylated alcohol, a detergent, or a combination thereof.

5. The method according to claim 1, wherein the wetting agent comprises from 0.05 wt % to 0.25 wt % with respect to the total weight of the binder composition.

6. The method according to claim 1, wherein the binder composition is added in an amount of 1 wt % to 15 wt % with respect to a total weight of the agglomerated particles.

7. The method according to claim 1, wherein the at least one of a rock, a mineral, or a combination thereof comprises one or more of basalt, metabasalt, andesite, granite, and rhyolite.

8. The method according to claim 1, wherein the at least one of a rock, a mineral, or a combination thereof comprises metabasalt.

9. The method according to claim 1, wherein the binder composition comprises sodium silicate, water, and the wetting agent.

10. The method according to claim 9, wherein the binder composition comprises (i) sodium silicate in an amount of 50 wt % to 80 wt % with respect to the total weight of the binder composition, (ii) water in an amount of 20 wt % to 40 wt % with respect to the total weight of the binder composition, and (iii) the wetting agent in an amount of 0.05 wt % to 0.25 wt % with respect to the total weight of the binder composition.

11. The method according to claim 1, wherein the binder composition comprises sodium silicate.

12. The method according to claim 1, wherein the agglomerated particles have a coating comprising silicate and clay.

13. The method according to claim 1, wherein the mixing uses a pin mixer.

14. The method according to claim 1, wherein the method further comprises pelletizing the agglomerated particles.

15. The method according to claim 1, wherein the method further comprises drying the agglomerated particles.

* * * * *